United States Patent
Pella et al.

(10) Patent No.: US 7,187,377 B1
(45) Date of Patent: Mar. 6, 2007

(54) THREE-DIMENSIONAL VIRTUAL TOUR METHOD AND SYSTEM

(75) Inventors: John P. Pella, Redmond, WA (US); Yaacov Kory Kuriel, Kenmore, WA (US); Charles A. Hale, Mountlake Terrace, WA (US); Scott A. Jensen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1014 days.

(21) Appl. No.: 10/187,044

(22) Filed: Jun. 28, 2002

(51) Int. Cl.
*G06T 15/00* (2006.01)

(52) U.S. Cl. .................. 345/419; 345/421; 715/850

(58) Field of Classification Search .............. None
See application file for complete search history.

(56) References Cited

U.S. PATENT DOCUMENTS

| | | | | |
|---|---|---|---|---|
| 5,414,801 | A * | 5/1995 | Smith et al. ................ | 345/419 |
| 6,192,393 | B1 * | 2/2001 | Tarantino et al. ........... | 709/203 |
| 6,476,812 | B1 * | 11/2002 | Yoshigahara et al. ....... | 345/427 |
| 6,618,047 | B1 * | 9/2003 | Lim ........................... | 345/421 |
| 6,654,014 | B2 * | 11/2003 | Endo et al. ................. | 345/427 |
| 6,710,774 | B1 * | 3/2004 | Kawasaki et al. .......... | 345/419 |
| 6,731,304 | B2 * | 5/2004 | Sowizral et al. ............ | 345/622 |
| 6,912,293 | B1 * | 6/2005 | Korobkin ................... | 382/100 |
| 6,961,055 | B2 * | 11/2005 | Doak et al. ................. | 345/419 |
| 2002/0118188 | A1 * | 8/2002 | Zviaguina et al. .......... | 345/421 |
| 2003/0043147 | A1 * | 3/2003 | Heim et al. ................. | 345/421 |
| 2003/0227455 | A1 * | 12/2003 | Lake et al. ................. | 345/421 |

* cited by examiner

*Primary Examiner*—Mark Zimmerman
*Assistant Examiner*—Enrique L. Santiago
(74) *Attorney, Agent, or Firm*—Workman Nydegger

(57) ABSTRACT

A method and system that archive a three-dimensional site in a highly-compact manner such that real-time, three-dimensional exploration and interaction with the site with high-resolution graphics is enabled. During authoring, information is collected about a site, and processed into a walkmap comprising a number of maps. A visibility map indicates which ones of the many polygons that make up a site are potentially visible from a given region. A collision map establishes where a can navigate in the site. A ground map tracks the terrain for reproducing camera heights and viewing angles, and a trigger map causes scripts to be fired from locations in the site. During navigation, only the maps relevant to a user's current position are active, whereby rapid rendering of an appropriate image for the user's current perspective is possible in real-time, providing a first person, perspective tour of the site in a perceived three-dimensional environment.

33 Claims, 14 Drawing Sheets

THREE-DIMENSIONAL VIRTUAL TOUR METHOD AND SYSTEM

FIELD OF THE INVENTION

The present invention relates generally to computer systems, and more particularly to presenting visual information to users of a computer system.

BACKGROUND OF THE INVENTION

One of the significant educational benefits that users receive from computer systems is the ability to interact with the computer system, and thereby receive personalized instruction, without the constraints of group instruction. For example, although viewing a film or slideshow in a group setting is educational, a user may learn much more and/or better retain the information when viewing the same information on a computer system in which the user can pause, replay, link to related information and so forth as needed, and at a chosen pace.

When the educational experience is one related to touring a location such as a historic site, films and slideshows are not the same as actually exploring the site, as among other drawbacks, such films and slideshows are limited to that of the filming author's viewing perspective. At the same time, it is impossible for everyone to personally view every site in which he or she may be interested in visiting. In fact, some sites cannot be visited by anyone because they no longer exist, at least not in the way they once historically appeared. Thus, at best such sites can only be recreated.

For example, for hundreds of years, historians, archeologists and scholars have tried to capture, observe and archive for the future how ancient historical architectural sites appeared in time, particularly in the prime of their existence. To this end, literature, drawings, maps and charts are studied by experts, with various theories presented and discussed until a generally accepted consensus is adopted and taught, at least until better evidence or a better theory arises. Artists' renderings have typically been used as the tool that provides images of how the experts believed the sites appeared.

A few attempts have been made to represent historical and other sites using a combination of photographs and digital rendering. However, although multimedia software now exists as an educational tool, the massive amount of data needed to accurately and comprehensively present such information to computer users has not heretofore been able to provide high-quality results with such software.

Moreover, none of these prior attempts create the illusion of first person exploration, at least not to any reasonably realistic extent, even though such realistic first person exploration can be a highly effective educational tool. For example, a significant improvement to interactive computing for educational purposes is taught by U.S. Pat. No. 6,234,802, entitled "VIRTUAL CHALLENGE SYSTEM AND METHOD FOR TEACHING A LANGUAGE," assigned to the assignee of the present invention and hereby incorporated by reference. The technology generally described in this patent provides a three-dimensional virtual world through which a user navigates, while interacting (an in particular, speaking) with various virtual people in order to learn a language.

While this works very well as an educational tool, the virtual world is created in advance, and the interaction controlled, as needed by the program authors. For example, the portion of the world displayed at any time is limited to images which a three-dimensional rendering engine and video hardware can easily handle.

However, with an environment such as an architectural site, the author does not get to choose the images that appear in the virtual world, but rather needs to represent them as is (or as experts theorize they appeared). As a consequence, the author cannot simply create the world as needed to match the hardware limitations. Indeed, with an actual site, there are possibly millions of polygons that are needed to represent a site with any reasonable amount of quality and realism. Conventional CAD programs or the like cannot process such amounts of information fast enough to represent a site in a real-time interactive setting with any reasonable amount of quality. Such programs cannot pass the information to the graphics cards, as existing graphics cards also would be overwhelmed by the large amount of polygons that need to be handled in real-time.

SUMMARY OF THE INVENTION

Briefly, the present invention provides a method and system that archive a three-dimensional site in a highly compact and efficient manner such that real-time three-dimensional exploration and interaction with the site is enabled, in high-resolution graphics using commercially available computer systems. To this end, information is collected about historical or other sites to produce a three-dimensional replica, comprising data corresponding to on the order of one million polygons. The three-dimensional replica data is processed to archive it into a highly-compact digital format. Once collected, formatted and stored, the archived information may later be used in real-time navigation to generate a highly accurate, high-resolution three-dimensional image from any perspective in the site to which a user can navigate.

The information is archived such that fast retrieval and straightforward processing is enabled, e.g., so that real-time navigation through the site in high-resolution may be performed by virtually any user using software on any average-powered personal computer. To this end, the data is stored as a combination of generally two-dimensional data structures, generally referred to as a walkmap. In one implementation, the walkmap includes at least one visibility map, ground map, collision fence map and trigger map.

To generate the visibility map, a site is divided into a two-dimensional grid, and regions in the site are determined by an author. A visibility map for each region is generated by determining only those polygons that are potentially visible from the various camera positions in that region, taken in six viewing directions (forward, backward, up, down, left and right) per position. By limiting the polygons to only those that may be viewed from a region, and then knowing which region a user is in when navigating the site, the number of polygons that have to be handled at any given time are dramatically reduced. A per-region bitmap, with one bit corresponding to each possibly available polygon in the site, maps whether each polygon in the site is potentially visible from that region. The bitmap may be compressed before archiving it as the visibility map for that region.

The author also determines lines of collision relative to grid locations and/or collision regions, and stores them in a collision fence data structure. During navigation, the collision fence data structure limits the areas where the user can navigate in a current site region or grid location, such as to prevent a user from walking through a wall or into a large object. Further, in addition to preventing movement into fenced areas, the collision fence data structure can be used to redirect the user along the collision fence, thereby facilitating movement through the site.

The author also establishes ground maps, e.g., per ground map regions, that track the camera surface at a given grid location in the ground map region. Via the ground map, the ground (camera) height and viewing angle are tracked, whereby later user navigation gives the impression of following the terrain, including ramps and steps. The walkmap may also store trigger maps that provide messages to fire scripts or the like when camera enters or leaves a particular trigger region, such as a grid rectangle.

During navigation, only the maps relevant to a user's current position are active, significantly reducing the amount of data that the navigation processing components need to deal with in real-time. Commands from the user, in conjunction with the relevant maps in the walkmap, determine the user's position, camera angle and direction in the site. Via the relevant visibility map for the current position, the possibly visibly polygons are known. Culling techniques, e.g., based on the camera angle/viewing direction, may further reduce the number of polygons that need to be handled. Those remaining polygons (e.g., on the order of a few hundred) are easily handled by the graphics subsystem to provide the real-time interactive environment, in high-resolution, three-dimensional graphics. The trigger map may be used to fire scripts as determined by the author, to produce various effects, e.g., such as to display labels upon selected objects in the site. As a result, a user experiences realistic navigation through a site in real time, using navigation commands to provide a first person, perspective tour of the site, including the freedom to explore each such site in a real-time, three-dimensional environment, at the viewer's own pace.

Other advantages will become apparent from the following detailed description when taken in conjunction with the drawings, in which:

DETAILED DESCRIPTION

Exemplary Operating Environment

Figure 1:
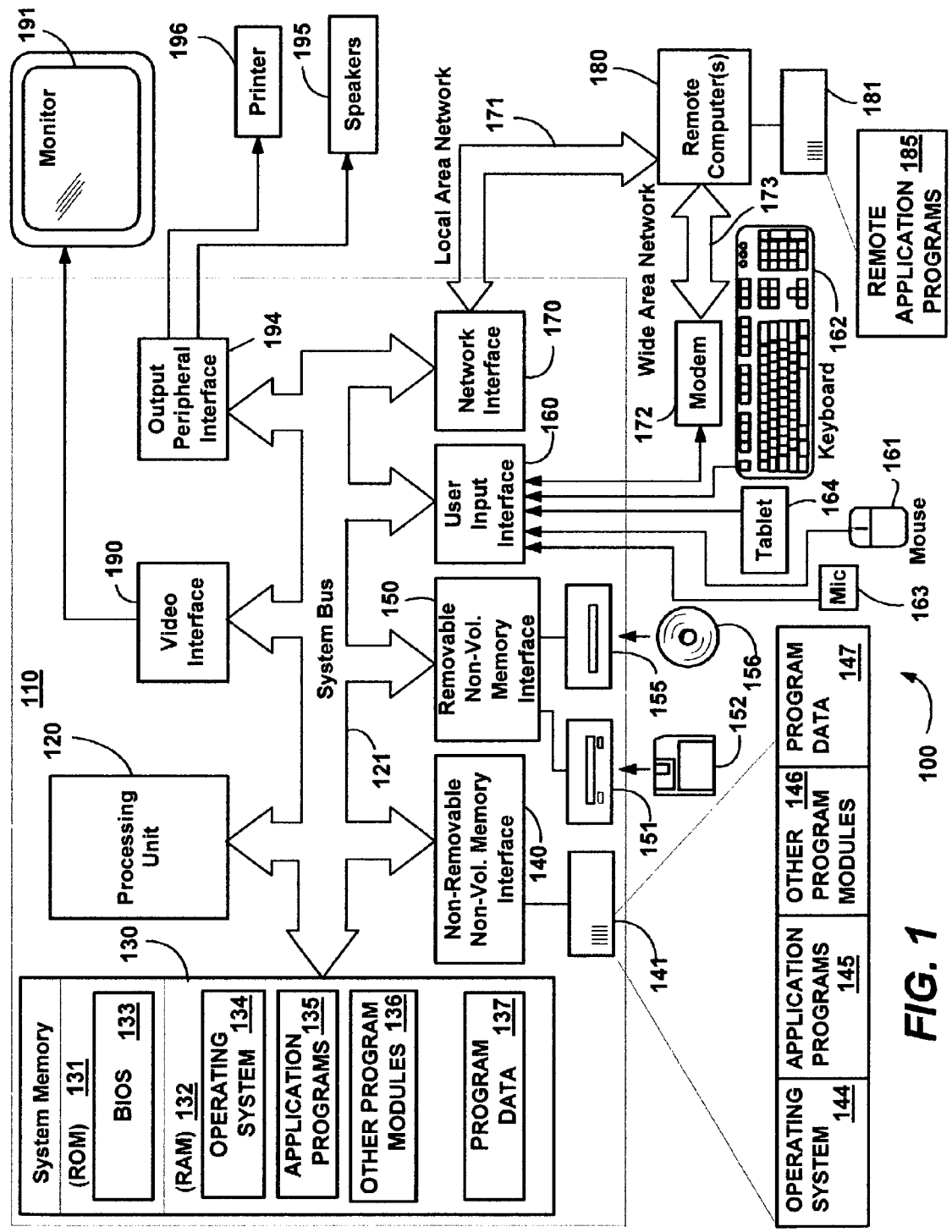
FIG. 1 is a block diagram representing one exemplary computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Three-Dimensional Virtual Tour

The present invention is generally directed to the archiving of data representing a site in high-resolution detail, for later three-dimensional re-creation of the sites in a real-time exploration environment. The method and system are particularly valuable in archiving ancient architectural sites that no longer exist, at least not in an intact form. However, as can be appreciated, the present invention is not limited to such ancient sites, but in fact can provide a virtual tour of almost anything or any place that a computer user would like to view in three dimensions via real-time navigation. For example, exotic locales, difficult to reach locations, and so on would all be likely candidates for archiving for later navigation. Thus, although the present invention may be in part described in terms of a site that is logically built of polygons in three dimensions by one or more experts that have assembled documentation of the site in order to recreate it, the present invention is also usable with sites that actually physically exist. Note that it is fairly common to reproduce things that do not currently exist in the form of a virtual computer image. For example, in the present invention, as part of archiving, a three-dimensional mathematical representation of a site is initially generated using commercially available three-dimensional modeling software, e.g., an author using a 3DX modeling application program or the like creates a polygonal representation of a site.

In accordance with one aspect of the present invention, a site is archived in a manner that significantly reduces the number of polygons that need to be processed and rendered to display that site from any given viewpoint during real-time navigation through the site. For example, although a site may require a million or so polygons to represent it, not all of those polygons are visible at all times from all perspectives. The archiving process efficiently stores maps and data to represent which of those polygons are potentially visible from various regions in the site, along with other features related to those polygons, so that a viewer mechanism (described below) efficiently selects only appropriate potentially visible surfaces (e.g., only five thousand or so) for those polygons, culls the number based on a user's current perspective, and sends those that remain (e.g., numbering in the hundreds or so) to the graphics subsystem to render an image. Note that making the computations to determine which polygons are potentially visible from any region is presently too complex to perform in real-time on conventional computer systems, and thus the preprocessing that occurs at archiving time is provided to enable rapid selection of only those polygons that are potentially visible, and thereby enable the later fast selection and additional processing in real-time.

Figure 2:
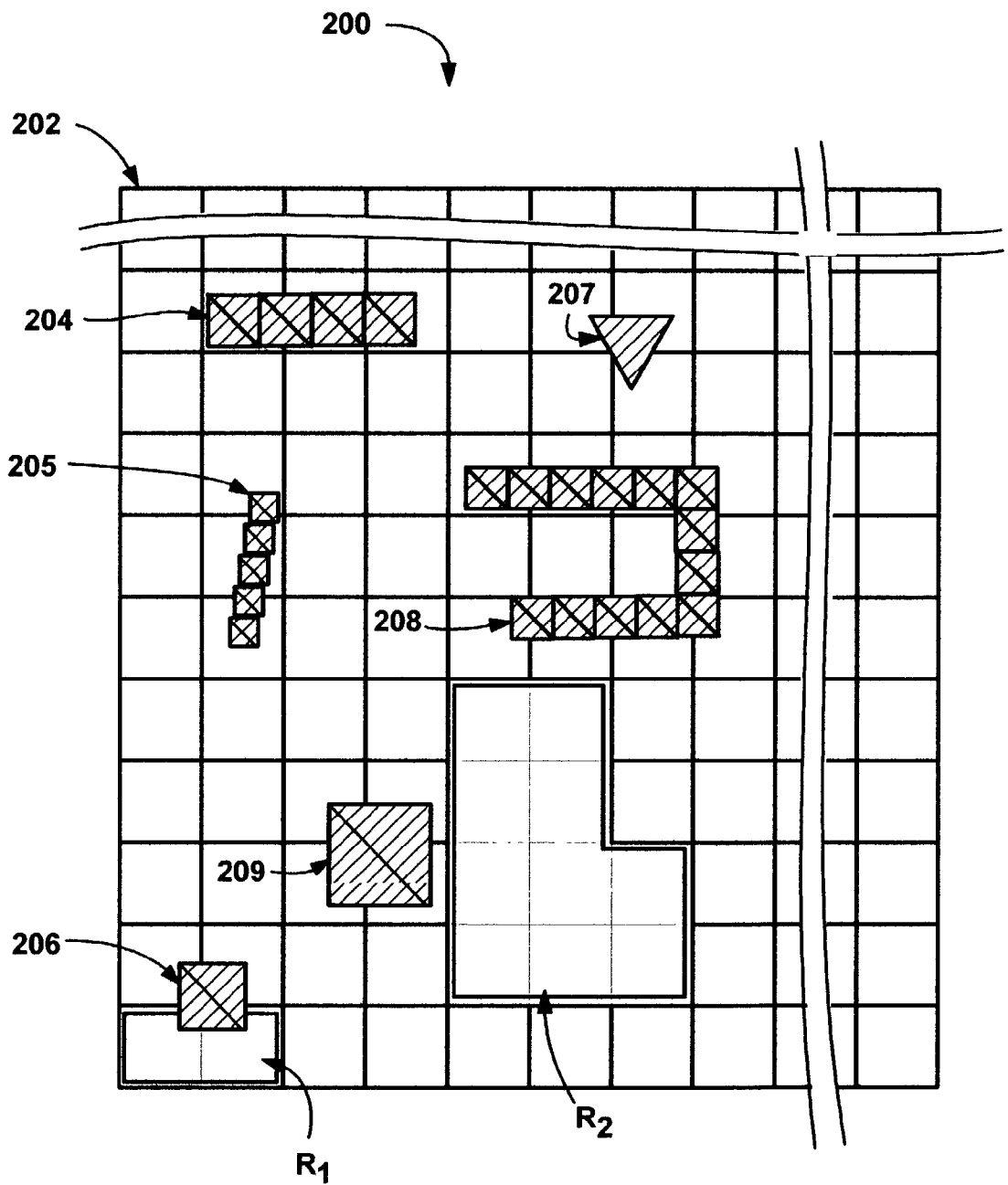
FIG. 2 is a representation of an example site divided into a two-dimensional grid, and representing regions and polygons in the site, in accordance with an aspect of the present invention.

To archive a site 200, as generally represented in FIG. 2, the site 200 is logically divided into a two-dimensional grid 202, such as comprising 4096 vertical by 4096 horizontal increments. The site is made up of a number of polygons, represented by shaded triangles in FIG. 2, grouped together into groups/objects 204–209, each group representing some structure in the site, such as a wall, floor, ceiling, column, statue and so forth, or a background, such as the sky, clouds, a hill and so forth. The background, floor and ceiling polygons are not shown in FIG. 2 for simplicity, but as can be appreciated, essentially surround the site.

It should be noted that the individual rectangles making up the grid need not be (and typically are not) square, that the vertical and horizontal increments need not be the same number, and/or that other numbers of increments (e.g., 1024 by 8192) may be used. However, for actual sites archived, (e.g., in Microsoft Corporation's Encarta® Reference Library 2002 software program), 4096 by 4096 provided a suitable array with resolution to better than one inch, and also provided computational benefits as a result of each number of increments being a power of two ($2^{12}$). An arbitrary number of rectangles in the grid 202 are represented in FIG. 2.

Once the site 200 is divided into the grid 202, an author then creates a number of regions at strategic locations throughout the site 200, two of which $R_1$ and $R_2$ are shown in FIG. 2. Although not shown in FIG. 2 (so that the grid 202 and polygon groupings or objects 204–209 also can be seen in the site representation 200), the author typically creates enough regions to cover the entire site 200 in areas in which the user can navigate, that is, anywhere in the site 200, except for locations that a user cannot move over or navigate into, such as a very narrow opening, is within a visibility region. Note that this does not mean the user cannot view into such a narrow opening, just that the user cannot move to that location, so recording visibility and other data (as described below) from that location would waste storage space. Generally the author's experience and knowledge of the site in general is a sufficient guide for determining the various regions' boundaries, however it is feasible to have a program or the like divide a site up into regions, such as based on various criteria, or even trial and error. Further, note that regions may split a cell, however cells are relatively small, and thus regions usually do not split cells.

Figure 3:
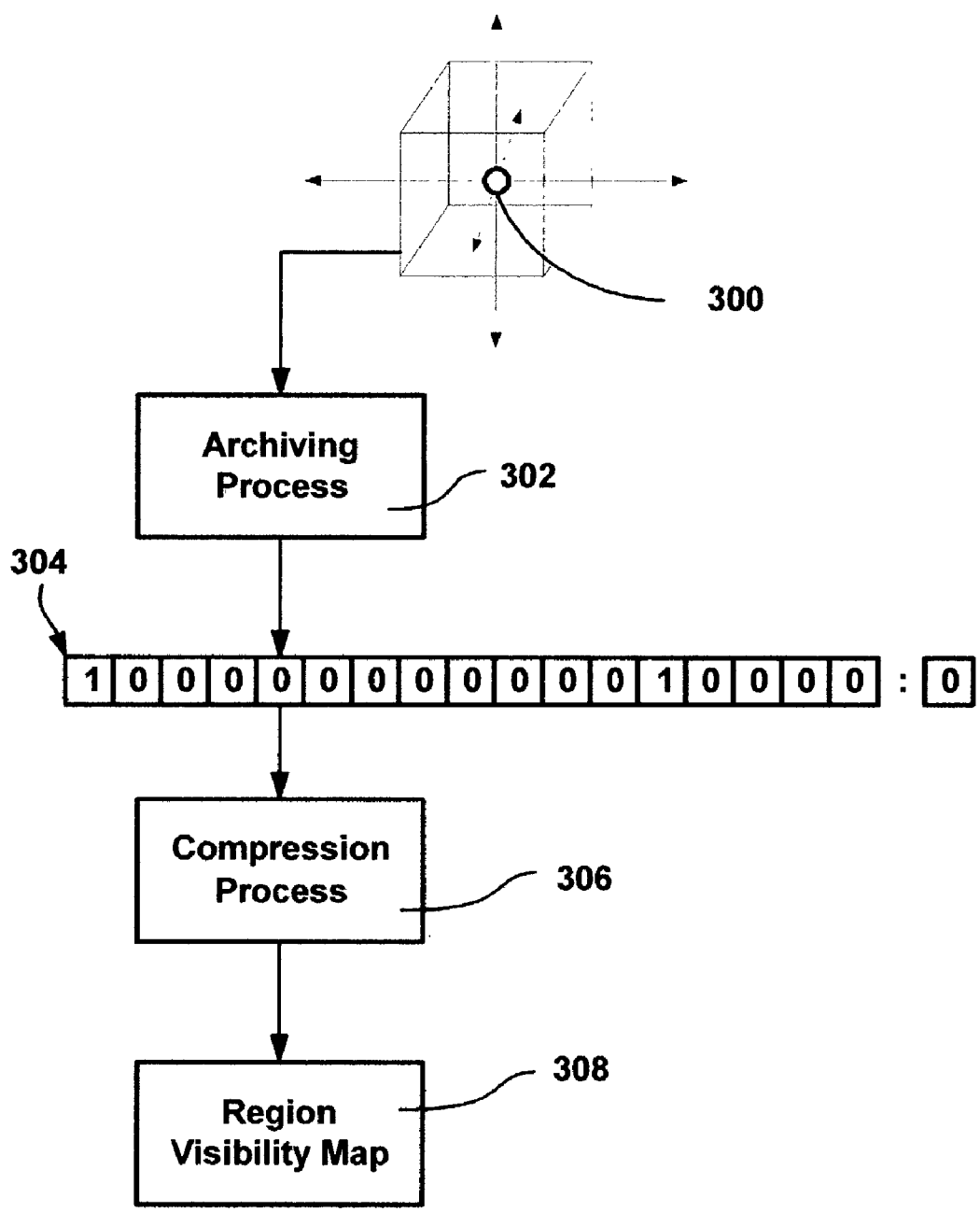
FIG. 3 is a representation of how a camera builds a per-region visibility bitmap from each given perspective in a region, in accordance with an aspect of the present invention.
Figure 4:
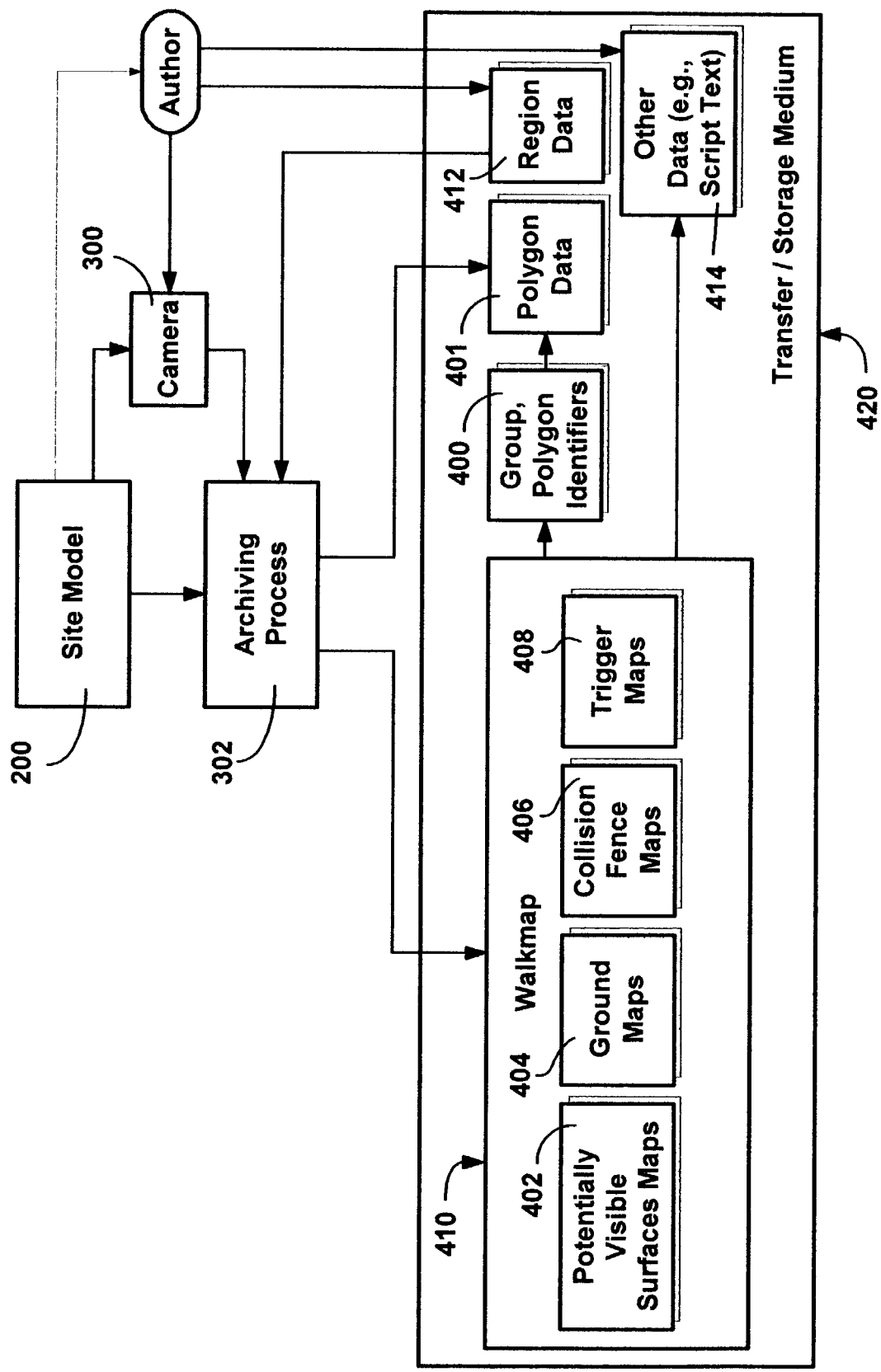
FIG. 4 is a block diagram generally representing components for archiving a site into a walkmap and other data in accordance with an aspect of the present invention.

Within each region, as represented in FIG. 3, a camera 300 then records in six directions, taken at ninety degrees to one another, (forward, backward, left, right, up and down), which of the polygons (e.g., of the million or so that make up the site) are potentially visible from the camera's current position. To this end, z-buffering techniques may be used, (which are known, although not heretofore in this context). As represented in FIG. 4, each polygon in the site has a group identifier and a polygon identifier in a set thereof 400, which index to the polygon data 401 (e.g., vertices, surface texture, color and so on) that represent that polygon. Note that most viewable objects are comprised of multiple polygons, and a sixteen bit group identifier with a sixteen bit polygon identifier within that group (a DWORD) provide an efficient indexing mechanism that corresponds well to actual viewable objects in a site. Further note that for simplicity, the present application refers to a million or so polygons, however as can be appreciated this is only a general approximation based on actual recreated sites, and that the exact number will vary for a site.

In accordance with an aspect of the present invention, for each polygon that is visible from the current camera location at an established height and viewing angle, a bit is set by an archiving process 302 in a visibility bitmap buffer 304, the visibility bitmap buffer 304 having one bit position available for each possible polygon in the site. Each position in the bitmap corresponds to one of the polygons that make up the site, e.g., a one million polygon site will have a one million bit bitmap. Note that what is being recorded are the polygons that are potentially visible in all six directions; whether or not they are rendered in a given frame will depend on the user's actual perspective during real-time exploration. In other words, in the visibility bitmap buffer 304, there is one bit available for every possible polygon in the site, and the position of each set bit in the bitmap identifies which polygon is deemed potentially visible from that region. Of course, instead of setting zero bits to one bits to represent potential visibility, it is equivalent to have an entire bitmap initially set to ones and then clear bits to represent potential visibility.

The camera is then moved to numerous other positions within the region (e.g., $R_1$, FIG. 2), either automatically according to some path or according to the author's control, with the camera capture process repeated at each other position. Any potentially visible polygons that were not previously visible have a bit for them set in the bitmap, e.g., by OR-ing the new results with those in the bitmap buffer 304. Although repeatedly moving to the various positions in the region, and recapturing and reprocessing at each position to determine the potentially visible polygons therefrom is relatively time consuming, this activity is performed at the authoring stage, not in real time, that is, the processing is not required when rendering.

The result of the many (e.g., hundreds or thousands) of camera shots for each region is the bitmap buffer 304 that identifies each polygon that is potentially visible from any point in the region where the camera was actuated, in any of the six directions. The bitmap 304 results in a substantial decrease in the number of polygons that the real-time viewing mechanism later needs to be concerned with in any given region, e.g., in practice it has been found that with a site's potentially visible polygons relative to a typical region's potentially visible polygons, the number of potentially visible polygons decreases from on the order of a million to on the order of five thousand. The author can adjust the regions if necessary to obtain desired reduction results.

Also, the author can check that potentially visible polygons were not missed, (e.g., by not having actuated the camera at a key location), such as by navigating through the site as described below, crossing region boundaries, and looking for missing polygons. When found, the author can note the coordinates of the problem location (e.g., via a test program), and actuate the camera 300 at the corresponding coordinates to correct the bitmap 302 for that region.

Preferably, once the bitmap 306 is filled in as described above, the bitmap 306 for the region is compressed by using a known compression process 306, such as one based on run length encoding, into an expandable visibility map 308 for that region (also referred to as a potentially visible surfaces map), whereby instead of needing a million or so bits to represent whether each polygon is potentially viewable or not from within a region, the amount of storage space needed is significantly reduced. Further, the bitmap may include other information, such as in a header, to indicate which region and/or grid locations to which the visibility map 308 corresponds.

The author repeats the process for every region in the site, generating a number of potentially visible surfaces maps 402 (FIG. 4), one for each region. These visibility maps 402, one per region, are thus generated and archived to a transfer/storage medium 420 such as a hard drive, CD-ROM file and/or an Internet storage location.

As described above, the visibility maps 402 provide a substantial reduction in the number of polygons that need to be processed, e.g., from a number on the order of one million to a number on the order of five thousand or so. Indeed, this alone generally makes possible a virtual three-dimensional tour with high quality, real-time exploration. However, the real-time three-dimensional virtual tour is enhanced in its realism by the use of other data structures (maps), including ground maps 404 that facilitate the realistic presentation of height variations (e.g., due to ramps, hills, stairs and so forth) as the user navigates a site during a virtual tour, collision fence maps 406 that allow the user to avoid walking into walls, avoid getting stuck in small rooms, and so forth, and trigger maps 408 that allow the tour author to cause performance of script-based actions based on a user's current position. These data structures and maps together are referred to as a walkmap 410. The region data 412 may also be stored, e.g., so that during real-time navigation, the coordinates in which the user's camera is presently at can be mapped to an appropriate region or regions.

In general, each ground map 404 stores information about the surface polygon on which the camera may be positioned in a region, e.g., spans of polygons including their first and last points. Note that each ground map region may or may not be the same as one of the regions defined for the visibility map (and or other maps, described below). Each one of the ground maps 404 is used to establish the height and/or angle of the camera at a given location, (e.g., grid position), on a per-region basis. For example, as represented in FIGS. 5A and 5B, at rendering time, as part of a ground check, for each coordinate location the ground map 404 for the current region is polled for ground polygon data, to determine which span (e.g., $S_1$ in FIG. 5A) that the camera (viewer) 500 is presently within.

Figure 5A:
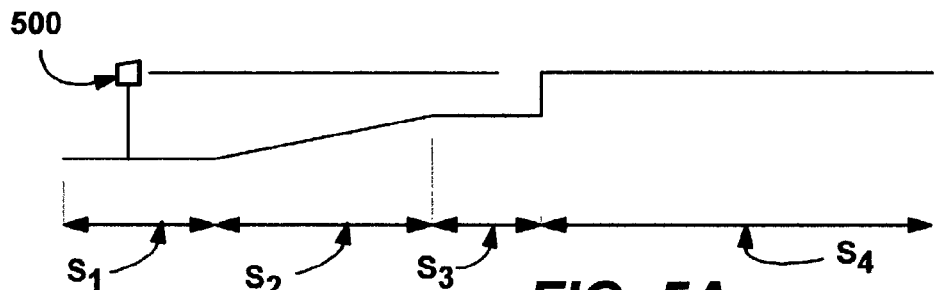
FIGS. 5A and 5B are diagrams illustrating how the information in a ground map may be used to provide the impression of following a site's terrain, in accordance with an aspect of the present invention.
Figure 5B:
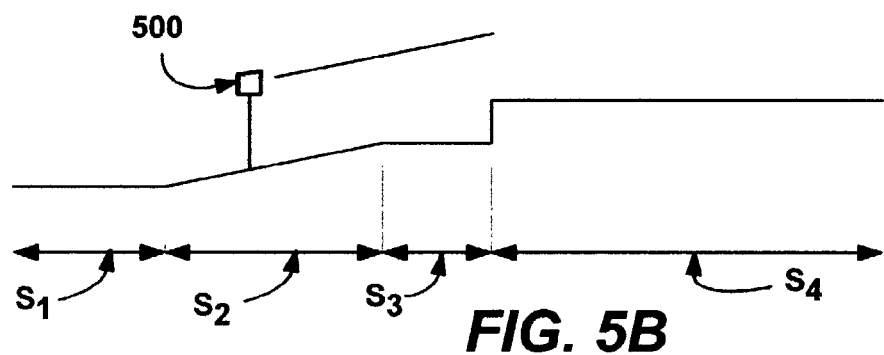

From the data associated with each span, the ground polygon's angle is known, and the camera angle may be pitched appropriately, such as represented in the change in the position of the camera 500 from FIG. 5A to FIG. 5B. The angle change may be gradual over multiple frames, to thereby provide the user with the impression of following the terrain. The ground map 404/polygon data 401 also can indicate an amount of rise, or camera height, which allows a user to appear to walk up stairs, climb onto a raised surface and so forth, e.g., a bit in the data associated with the polygon may be used to indicate a stair polygon. A rising (lowering) time also may be stored, providing the effect of an elevator or escalator. Thus, although the user is preferably constrained to navigating on the surface, via the ground map 404 the surface height can be varied, with additional effects possible.

Figure 6:
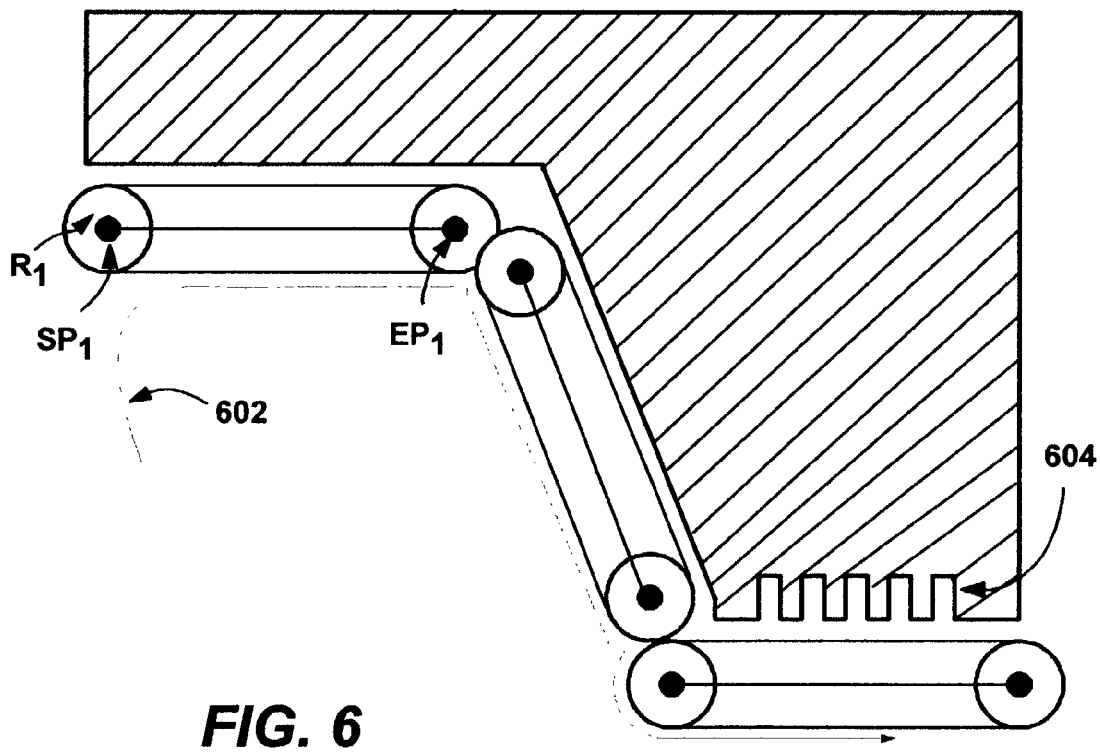
FIGS. 6 and 7 are diagrams illustrating how collision information is used to limit and/or control a user's navigation through a site, in accordance with an aspect of the present invention.

The collision fence maps 406, or simply collision maps, enable the author to limit the ability for a user to navigate in the site, e.g., on a per-collision-region basis. The collision map 406 allows an author to prevent a user from walking through walls, walking past guardrails, and so forth. In general, as represented in FIG. 6, the collision map 406 stores collision segment data (e.g., a starting and ending point such as $SP_1$, $EP_1$), and collision radius data (e.g., $R_1$), as established by the author. Note that the same collision radius may used for the both the starting and ending points, however it is straightforward to have a different collision radius used for each. In general, and as described below, a user colliding with something protected by a collision fence is automatically steered along the collision fence at a distance equal to the collision radius, as generally represented by the dashed arrow 602 indicating a user's camera path.

Note that the collision map 406 need not be limited to following a wall or otherwise controlled in any way by the actual site. For example, although realism is generally desirable, if desired, the author may allow a user to climb on a relatively high surface, appear to walk through solid doors (or even walls), and so on. Further, as represented in FIG. 6, indentations 604 and the like (such as columns too close to walk between) may be determined by the author to have a single collision boundary, so that a user perceives a smooth experience when walking along such an irregular surface, rather than bumping into and out of each such indentation.

Figure 7:
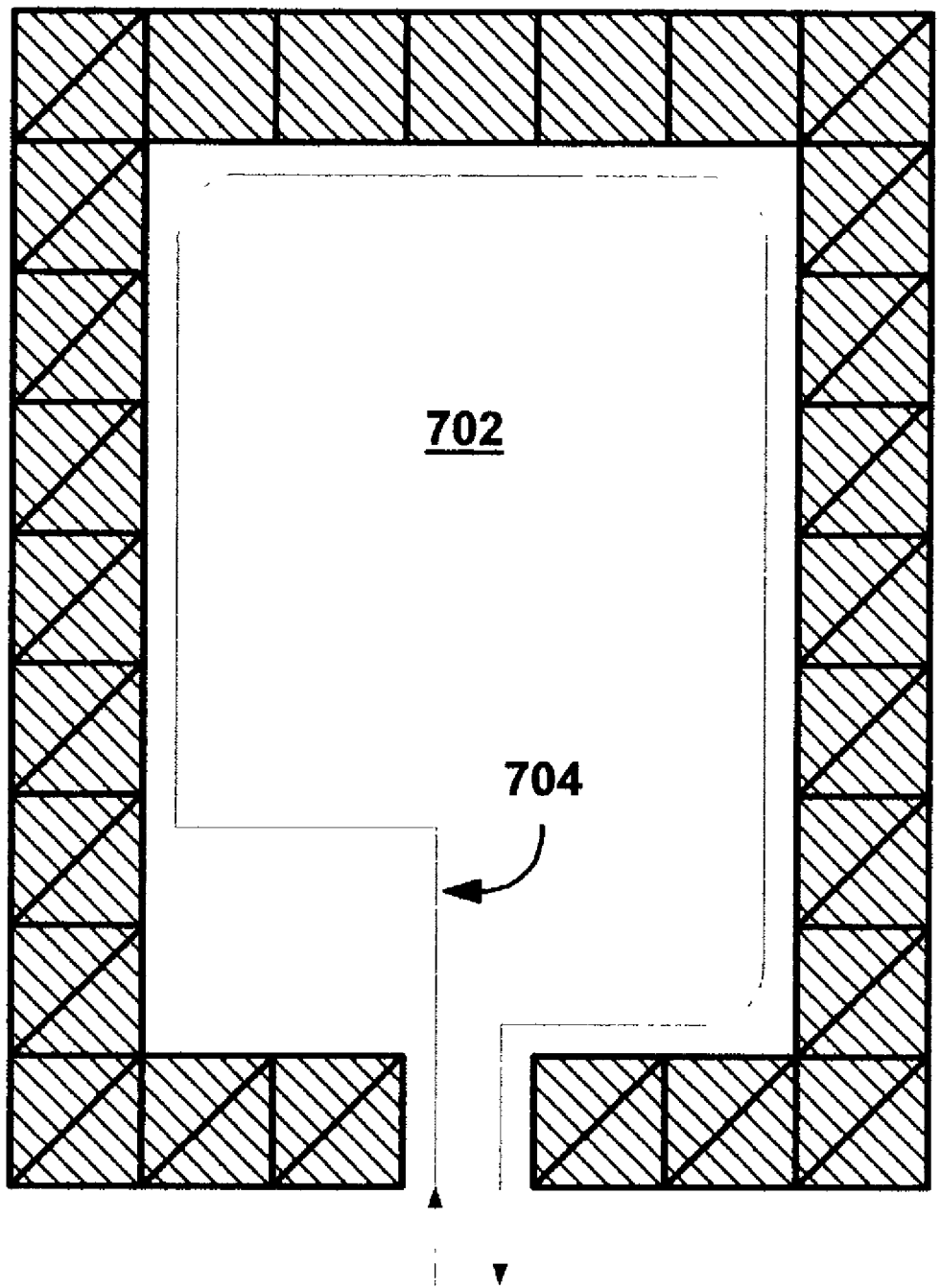

Moreover, as represented in FIG. 7, through the use of a collision fence the author can control the user's navigation to an extent. For example, consider that the mostly bounded area 702 shown in FIG. 7 is relatively small, such as representing a small room. Collision sensing, (not shown by collision fences in FIG. 7 for simplicity) can prevent a user, such as following the path 704, from getting stuck in the room, since the collisions can be used to steer the user back to the entryway (or another exit if one exists).

For efficiency, the ground maps and/or collision maps may be stored in a compressed format, (in the same general exploding format of the visibility map), with the data mapped per their own defined regions (which may be as little as a single grid rectangle). This significantly reduces the number of evaluations required to determine applicability at any given time, e.g., per region testing instead of the entire site reduces the amount of data that the viewing process needs to handle. Further, the data may be used such that the information may be more efficiently processed. For example, during real-time exploration, the camera position data and a quick radius check can be used whether a collision fence is close enough to even warrant consideration in testing against for possible actual collision, that is, many of the collision fences in a region can be quickly eliminated from consideration, leaving a lesser number that require a full collision test. Note that the collision test is preferably two-dimensional, reducing the complexity of computations.

Another map that is used to enhance the exploration is a trigger map 408 (FIG. 4). The trigger map 408 is used when a camera is entering or exiting a certain trigger region, e.g., one or more grids, (and can also be arranged to trigger something if remaining in a trigger region). In general, the trigger map indicates whether a given polygon (e.g., surface polygon) or grouping thereof has a script associated therewith. When a trigger is reached as determined via the trigger map, the viewing mechanism that interprets the walkmap sends a message, such as a string of characters, (e.g., "execute script #12"), to a host program, which for example may be a browser, as described below with reference to FIG. 11. The host program then handles the message as desired. Note that the trigger region can comprise one or more grid units, e.g., the points are identified that fire scripts when the camera either enters or leaves a grid rectangle. The script data 414 (e.g., text strings) to send are maintained with the other data on the storage 420.

By way of example, the author may want a label (or link) to appear when a user nears a certain door, statue and so on, so that the user has the option of clicking the label to link to more information about the object. At the same time, the author ordinarily would not want every possible label displayed at all times, only certain ones when the camera was near a certain point. The trigger maps 408 provide the message to trigger the display of the correct labels when the camera passes over exits and/or enters an appropriate trigger region.

Another example of when a trigger may be used is to change a map. For example, a user walking up stairs may reach a point in which a different collision map is needed, whereby that point is set to trigger the activation (exploding into memory) of the new collision map.

Figure 8:
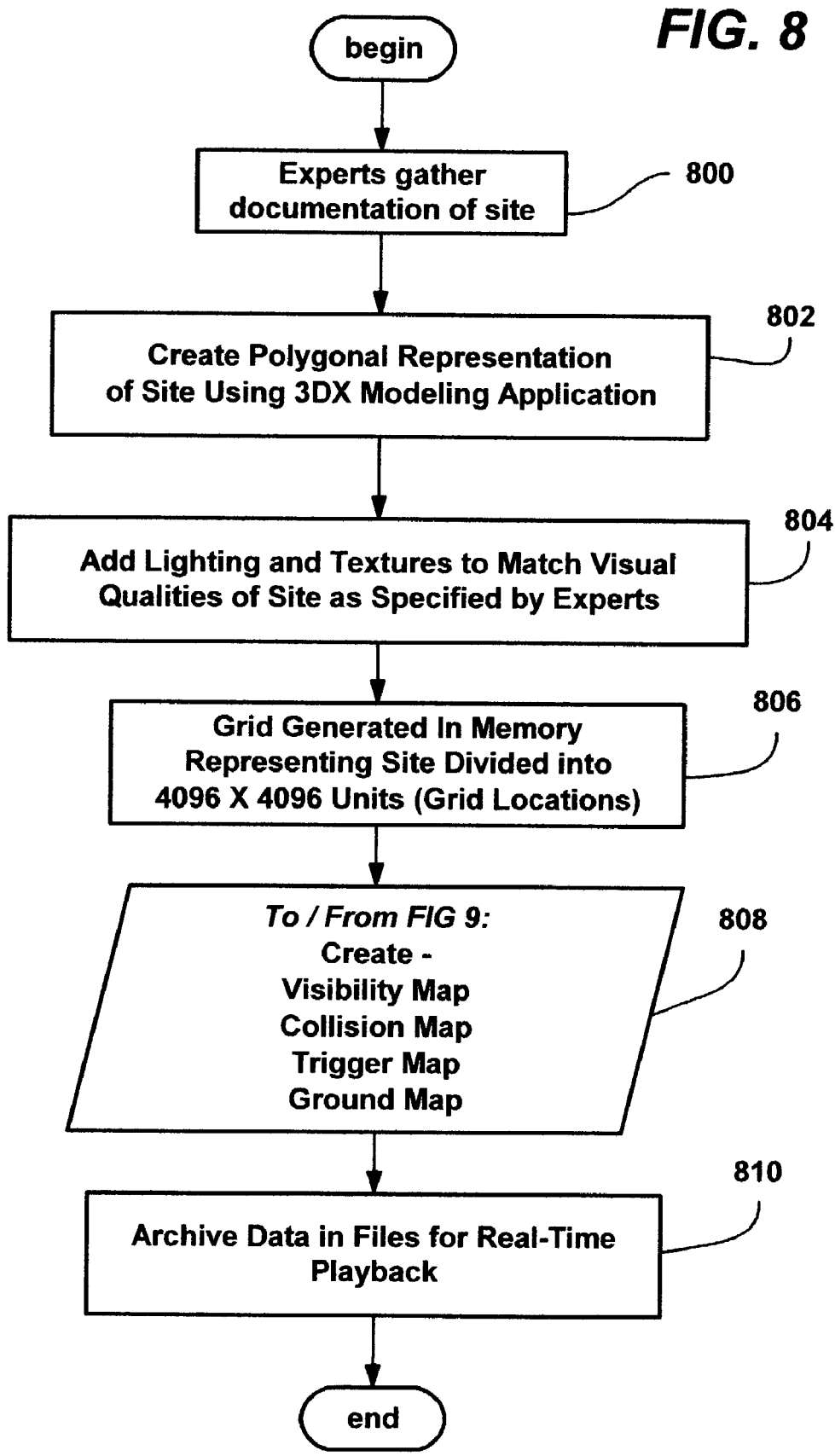
FIG. 8 is a flow diagram generally describing the overall archiving process for a site, in accordance with an aspect of the present invention.

The author thus collects and/or determines the various map data as a set of specially calculated and organized data, i.e., the walkmap 410. FIG. 8 summarizes the archiving actions, beginning at step 800 which represents the experts gathering the site documentation. Step 802 represents creating the polygonal representation of the site, e.g., using a three-dimensional modeling application, while step 804 represents adding lighting and textures to match the visual qualities of the site, e.g., as specified by the experts. Note that steps 800 and 804 are generally outside the scope of the present invention, as, for example, an existing site need not require experts. Further, the use of three-dimensional modeling applications at step 802 for various purposes is generally well known, and is thus not described herein, other than to generally note that polygons may be arranged into discrete objects at this step.

Steps 806 and 808 represent the creation of the walkmap 410, beginning with the generation of the grid 202 (in memory) that represents site 200 (FIG. 2), e.g., divided into 4096×4096 grid units/grid locations. The generating of the maps 402, 404, 406 and 408 that comprise the walkmap 410 are further described with reference to FIGS. 9A and 9B.

Steps 900–920 represent the creation of the visibility maps 402, beginning at step 900 of FIG. 9, wherein the visibility regions are defined, and steps 902 and 904 wherein the camera is logically positioned in a selected region. At step 906, polygons are rendered, without shading, into a temporary depth buffer. Each entry in the buffer stores the closest depth rendered so far (z-buffer), and the object and polygon. When complete, only those objects and polygons not overwritten can be considered to be potentially visible from that position in that direction.

Step 910 represents the process of steps 906 and 908 being repeated, each time with camera rotated 90 degrees until all six directions (up, down, left, right, forward and backward) are taken. In other words, each repetition determines the potentially visible objects/polygons through each side of an imaginary cube surrounding the camera 300 (FIG. 3). Step 912 compiles those six rendered views into the potentially visible list, e.g., a bitmap as described above, which may be compressed at this time, (e.g., run-length encoded) or at some later time.

Figure 9A:
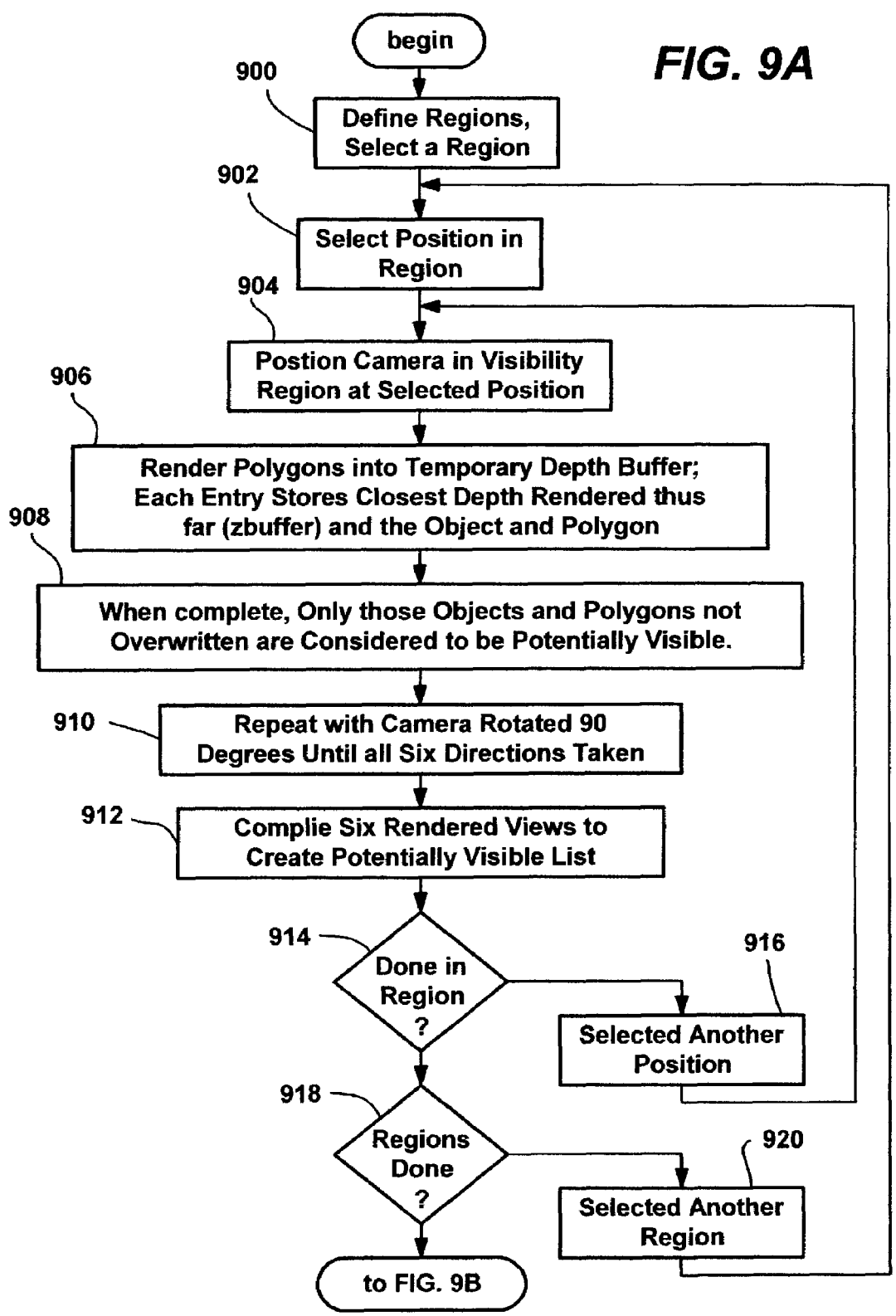
FIGS. 9A and 9B comprise a flow diagram generally representing construction of the walkmap, in accordance with an aspect of the present invention.

Steps 914 and 916 represent the repeating of the process from other positions in the regions, while steps 918 and 920 represent repeating the process for the other regions until none remain. It should be noted that for efficiency, much of the processing is not done between camera shots as represented in FIG. 9A. Instead, in actual practice, the camera is moved, the six directional shots taken and the data merely recorded with minimal processing at this time. Instead, the bulk of the data processing data is performed later, for a large number of camera shots, so that the author can move to other positions in a region quickly, and then to positions in other regions, without having to wait for the processing to complete before taking the next camera shot. In other words, the computation of potentially visible objects and polygons forming each grid point written to each visibility location is essentially performed offline.

Figure 9B:
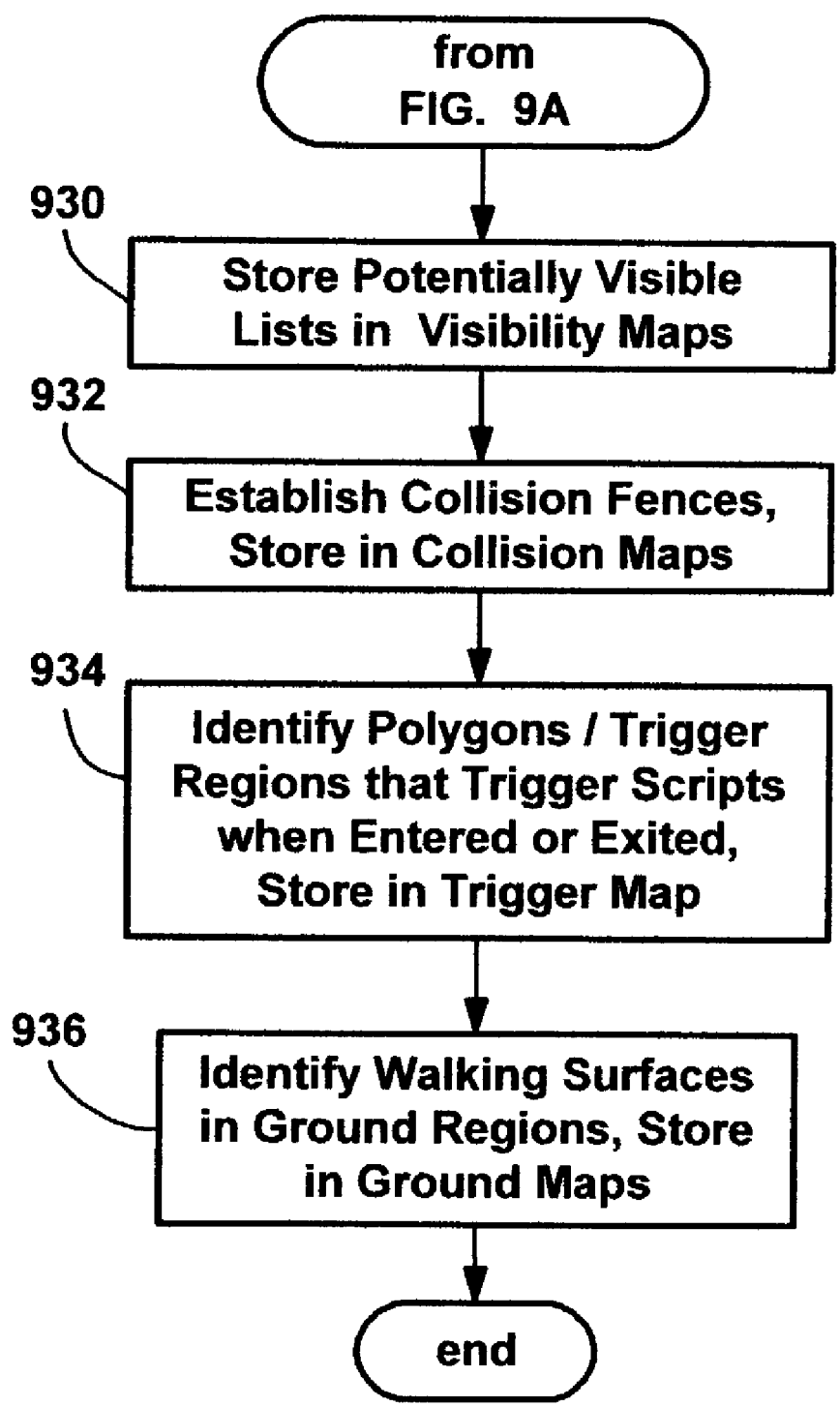

Step 930 of FIG. 9B represents storing the lists into the visibility maps 402 (which if not yet compressed can be compressed at this time) and writing them to the storage medium 420 (FIG. 4). Step 932 represents the collision fence map 406 determination and storage, that is, the lines of collision and radii established by the author are generated and stored for each grid location covered.

Step 934 represents the trigger map 408 determination and storage, e.g., wherein grid (or grid region) points are identified that fire scripts when the camera either enters or leaves a grid rectangle, as described above. Step 936 represents the ground map 404 determination and storage, wherein for example, the polygons representing the ground at each grid location are mapped, as also described above. Note that the various maps of the walkmap 410 are separate, and thus generally may be assembled in any order, although they may be compiled into a single file, such as with offset pointers, lengths and the like to differentiate the various data therein.

Returning to step 808 of FIG. 8, the data in the maps, along with other data such as the polygon data, are aggregated and written to storage at step 810. At this time, a permanent archive has been made, and can be played back in a real-time, three-dimensional exploration, as discussed below. In other words, once stored in a CD-ROM or other physical or logical storage medium 420, the data represent a permanent record of the site, arranged in a compact digital manner that enables real-time exploration of a high-resolution representation of the site.

Figure 10A:
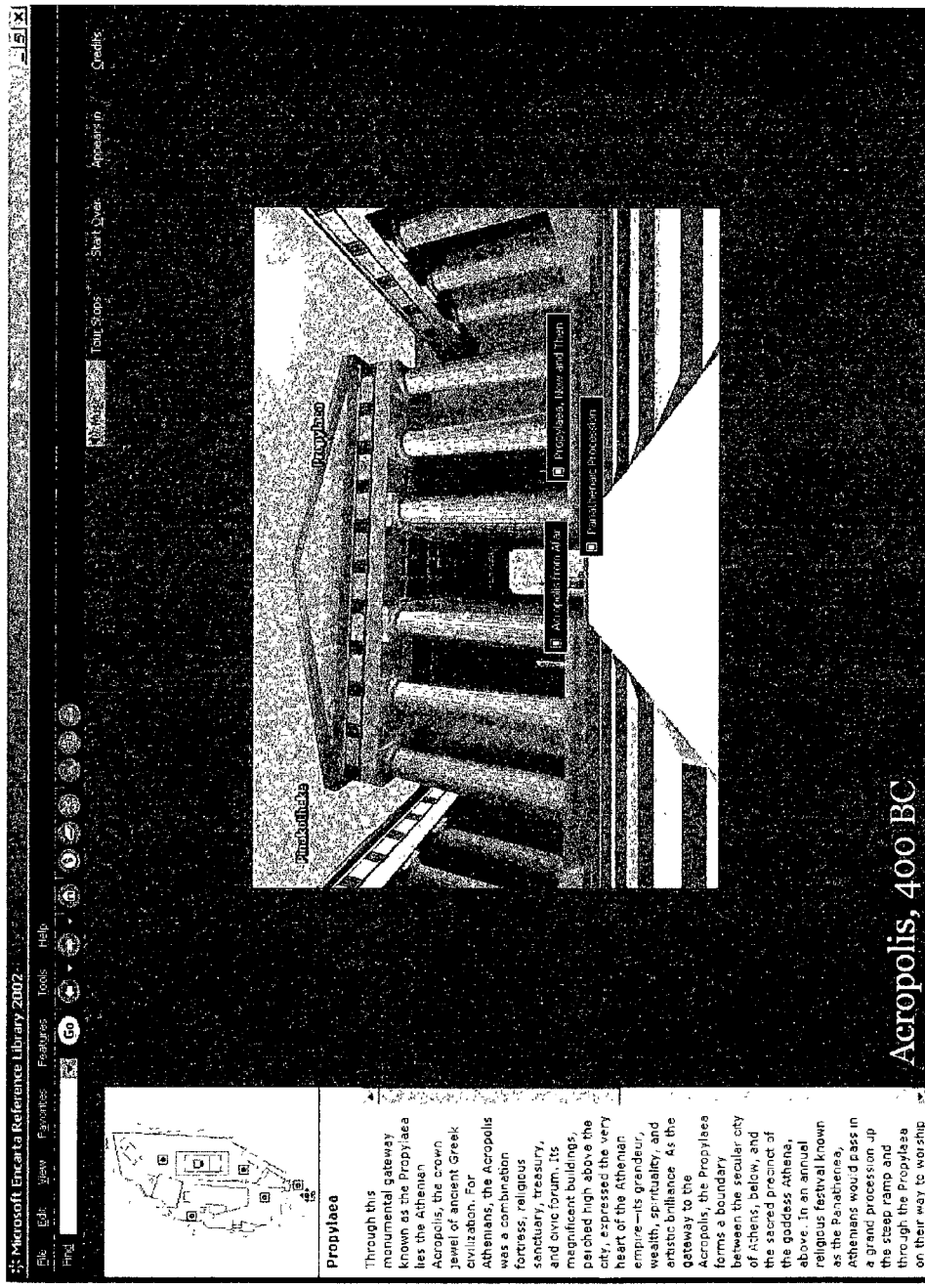
FIGS. 10A through 10C are exemplary screenshots taken at selected perspectives during interactive navigation through a site during a virtual tour, in accordance with an aspect of the present invention.
Figure 10B:
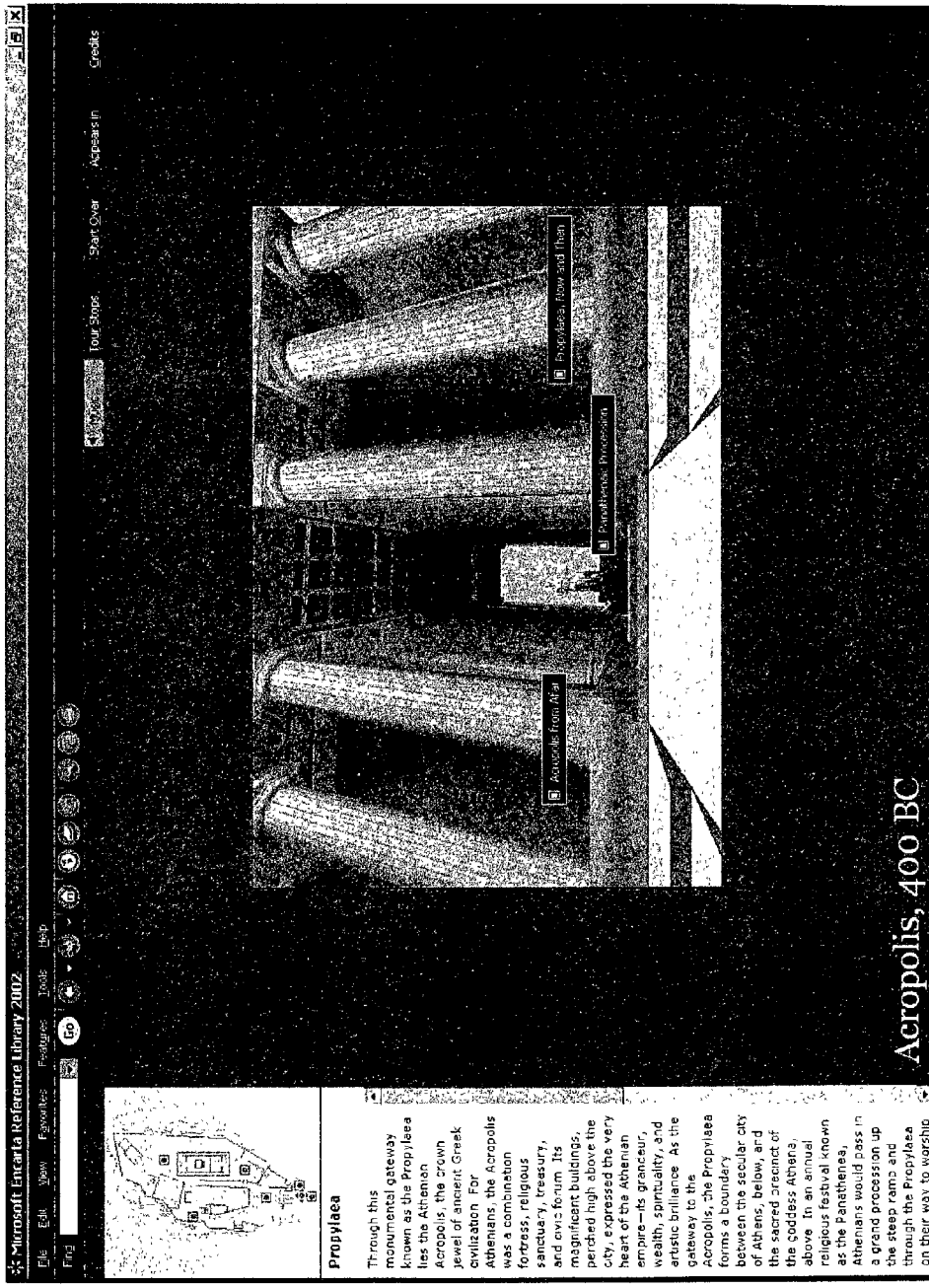
Figure 10C:
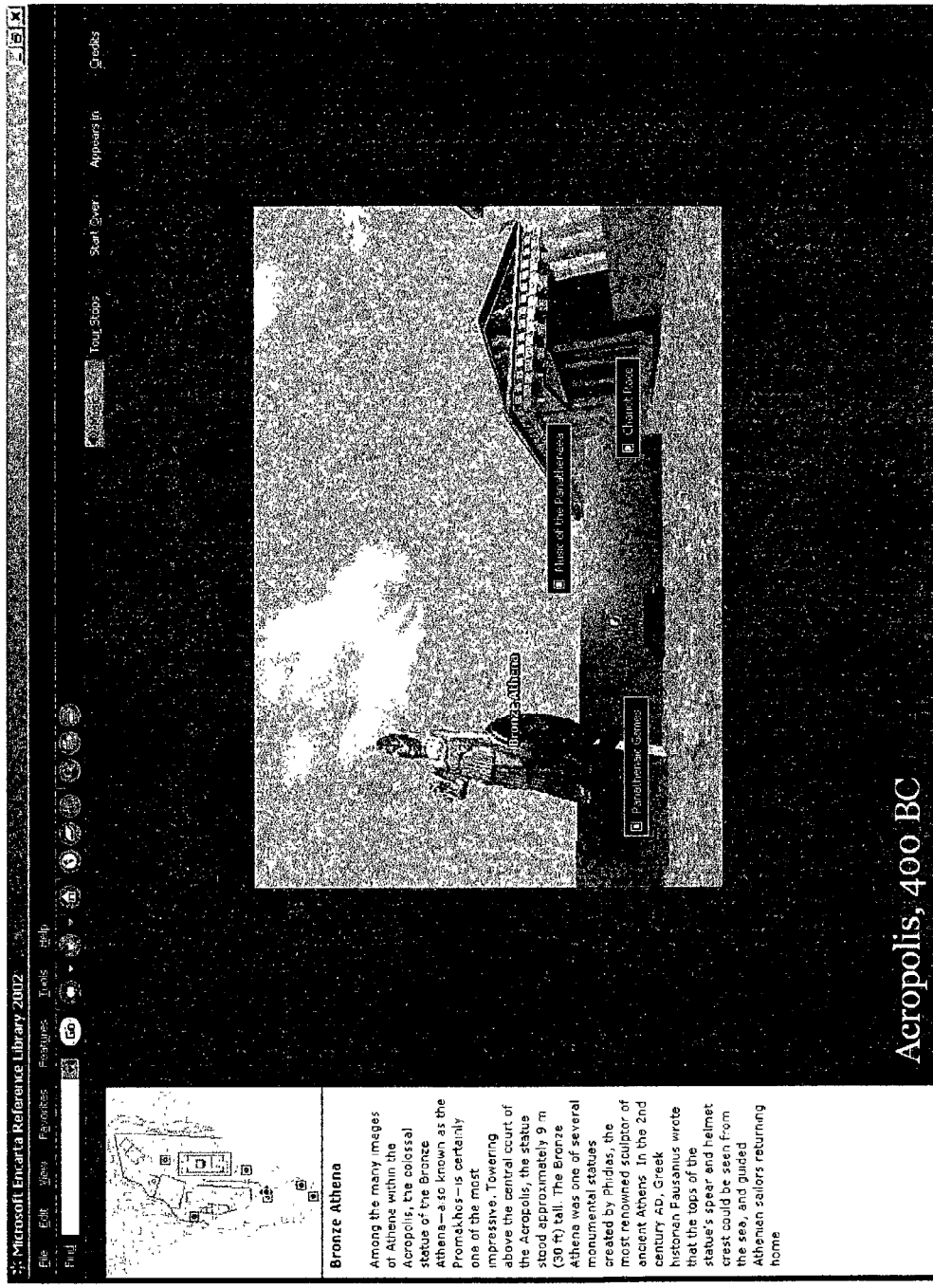

Turning to an explanation of the real-time rendering process, FIGS. 10A–10C are screenshots taken at various times during such a three-dimensional virtual tour. As can be seen, the progression from FIG. 10A to FIG. 10B is generally rising upwards and forwards, with smooth and gradual movement over some number of interim frames (not shown), while from FIG. 10B to FIG. 10C the user has moved upwards and turned to the right, again via a number of interim frames (not shown). The visibility maps control what is shown, the collision maps are tested to control the user's path, the ground maps elevate the user and aim the camera up and down to follow the terrain, and the trigger map is used to display and erase the various labels. The trigger map may also be used to swap in appropriate region maps, although a coordinate-based indexing mechanism can also handle such operations.

Figure 11:
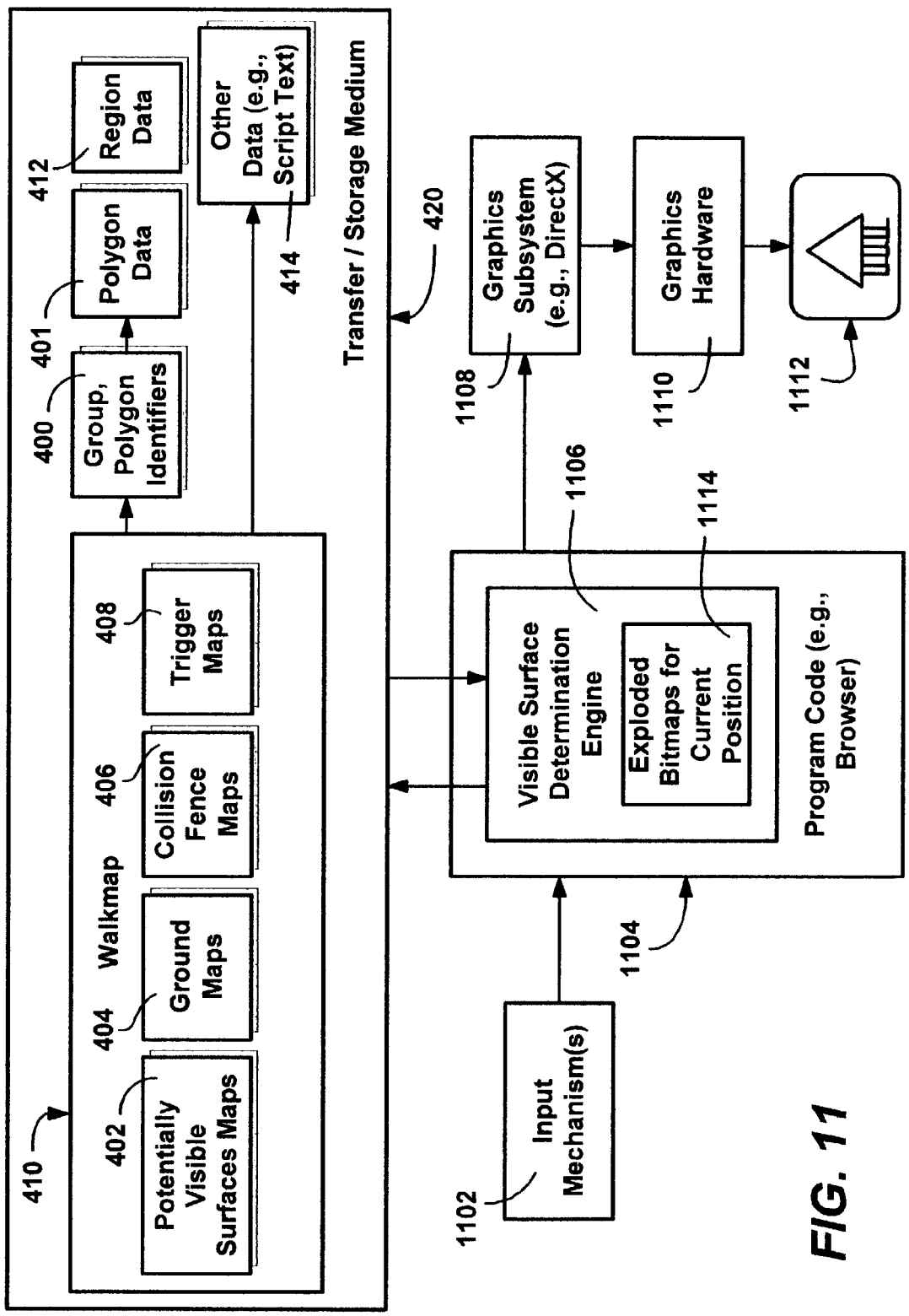
FIG. 11 is a block diagram generally representing components for processing the walkmap and other data to generate a high-resolution image of the site from the user's current perspective, in accordance with an aspect of the present invention.

FIG. 11 represents the various components used in rendering the real-time display as the user navigates through the site. The various maps and other data in the transfer/storage medium 420 are essentially the same as those in FIG. 4, and are thus not described again. In general, as the user commands are received from an input mechanism 1102, e.g., mouse, keyboard, speech commands, and so forth, a program 1104 passes the commands to a visible surface determination engine 1106. In one implementation, the visible surface determination engine 1106, or viewing mechanism, is designed as an ActiveX® control such that it can be hosted by the program code 1108. Alternatively, a viewing mechanism may be any executable code that can exchange data with another application, and indeed, the viewing mechanism and program code can be a single component.

In general, and as described below, the user commands are interpreted to determine a location in the site that the user's camera is currently at, along with a viewing angle. Those polygons not visible from that perspective are eliminated, e.g., those behind the camera, those too high or too low for the camera to view, and those too far left or right for the camera to view. Well-known culling techniques are used to reduce the number of visible polygons to a frustrum of view. In practice this typically results in about one-quarter of the possibly viewable polygons remaining, e.g., from around 5,000 to 1,250. Backface culling, another well-known technique that eliminates obscured polygons, is also performed, typically halving the number to display, e.g., from 1250 to 625. Although the numbers are only approximate, the general reduction from on the order of one million possible polygons to on the order of a few hundred polygons that need to be handled by the graphics subsystem 1108 and subsequently the graphics hardware 1110 make the high-resolution rendering possible in real-time.

Figure 12:
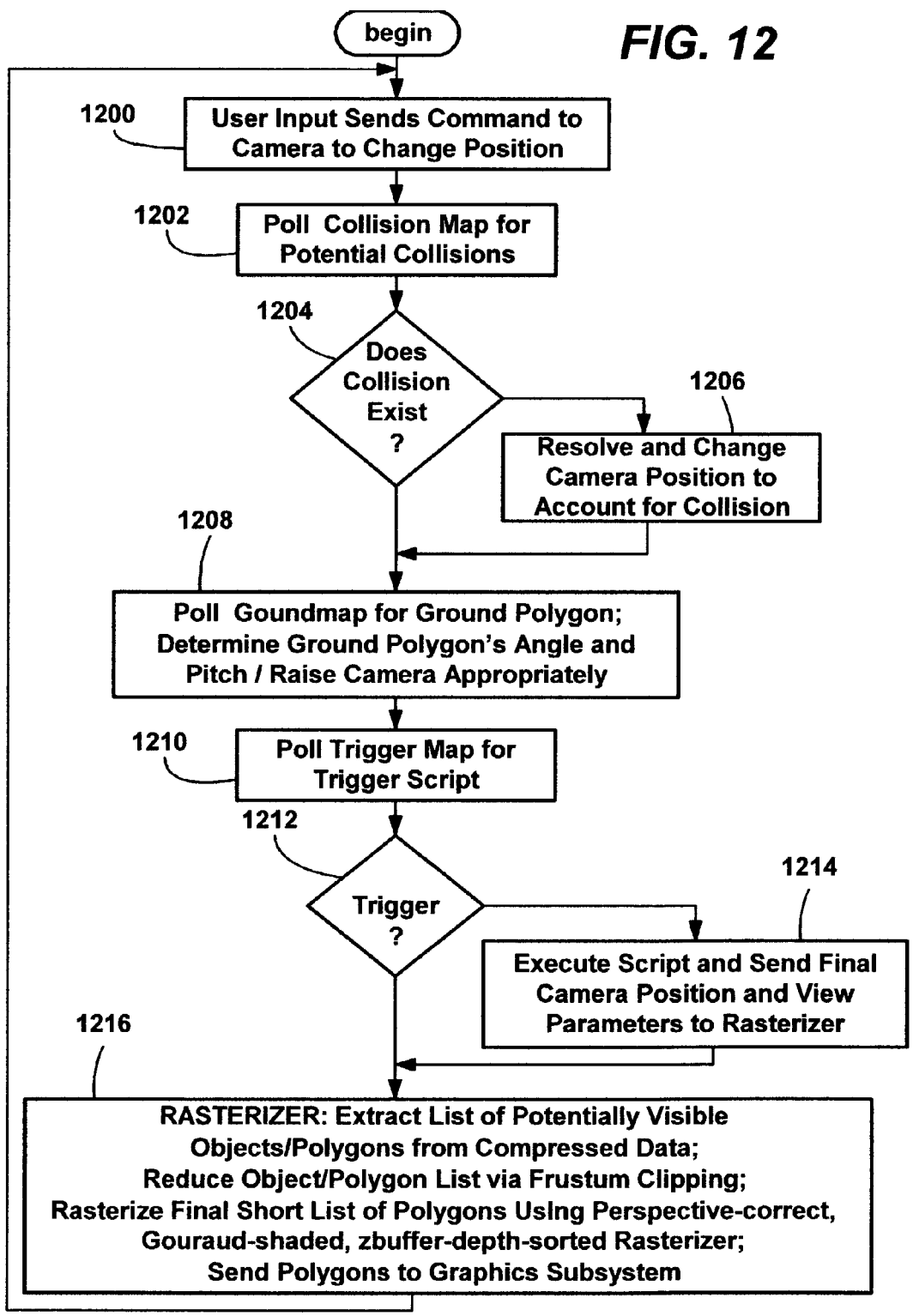
FIG. 12 is a flow diagram generally describing the operations taken by the components of FIG. 11 to handle interactive navigation through the site, in accordance with an aspect of the present invention.

FIG. 12 describes the real-time exploration process, e.g., performed by the visible surface determination engine 1106 and the program code 1108. Step 1200, which occurs following an initial display of the site from an author-chosen starting perspective, represents a user sending a command to the logical camera to change its position, i.e., the user walks through the site using the input mechanism(s) 1102. Note that some additional initialization may be performed prior to the steps shown in FIG. 12, e.g., the various maps corresponding to the user's starting camera position may be exploded into corresponding full bitmaps 1114 (FIG. 11) to facilitate fast processing, audio may be played, and so on. Further, note that at the beginning of each frame, a check is ordinarily performed to determine whether the camera is on a different (and therefore unexploded) portion of the region map. If so, then the old line is destroyed and the new one exploded, whereby the author/scriptor need not be concerned about the in-progress walkmap data when a trigger changes out the walkmap data.

At step 1202, based on the current position and the command, the walkmap 410, and in particular the appropriate exploded collision map, is polled to determine whether the location to which the user is requesting to navigate is protected by a collision fence. Note that as described above, each collision fence in a region need not be individually tested for actual collision if a faster test, such as one that compares the current coordinates with the segment coordinates plus the collision radius can quickly eliminate certain collision fences from consideration.

In typical navigation, collisions are relatively rare, and when none is detected the movement is allowed, as represented by the collision test of step 1204 branching ahead to step 1208. However, when a collision is detected at step 1204, the collision is resolved at step 1206. In general, step 1206 adjusts the camera position and/or angle that differ slightly from what the user commanded. In essence, the collision detection does not normally stop the user, but smoothly redirects the user along the fence, according to the author's positioning of the collision fence. To enhance realism, in general, the more a collision is head-on with a fence, the less quickly the user will be strafed along the fence, i.e., the more head-on, the more the user will appear to drag along the fence, unless and until the user turns sufficiently to be going parallel to the collision fence (at which time the user will resume normal navigation speed). Such collision handling, although not necessary to the present invention, provides realism and helps users avoid getting stuck in or having to back out from a particular spot.

Once the next valid position is determined, regardless of whether chosen by the user or because of collision, step 1208 polls the ground map to determine the ground polygon that applies, whereby the angle is determined and the camera pitched and/or raised appropriately. This information is used in selecting the next set of polygons to render.

Step 1210 polls the trigger map to determine whether leaving the current location or entering a new location (or staying in the same location) corresponds to a trigger. If so, as detected at step 1212, the trigger message is sent, e.g., to execute a script at step 1214. For example, the browser code may provide label data for display at this time, play alternate audio, change the walkmap data, and so on.

At step 1216, the image is now ready to be rendered. To this end, a rasterizer of the visible surface determination engine 1106 extracts the list of potentially visible objects/polygons via the data in the exploded visibility map, as described above. Then, using known techniques, the rasterizer reduces the object/polygon list via frustum clipping, and rasterizes the list into a final short list of polygons using a perspective-correct, gouraud-shaded, zbuffer-depth-sorted rasterizer. The list corresponds to the polygon data that needs to be displayed. Thus, beyond processing the walkmap as described above, most of the visible surface determination engine components are similar to those described the aforementioned U.S. Pat. No. 6,234,802. Notwithstanding, the walkmap processing is a significant amount of the overall processing, e.g., relative to the processing performed by these similar visible surface determination engine components.

The remaining short list is then sent to the graphics subsystem for processing, thereby rendering the appropriate display in high-resolution. The process returns to step 1200 to await the next user command. In this manner, a user can navigate a site in real time via commands that relate to rapid selection, culling and presentation of an image, providing a high resolution, three-dimensional virtual tour.

As can be seen from the foregoing detailed description, the system and method gather information available about a site, process it and archive it in a digital three-dimensional format that allows users the opportunity to take a first person perspective tour of the sites, and have the freedom to explore the site in a real-time, three-dimensional environment, at each user's own pace. As a result, even with a site made up of hundreds of thousands or millions of polygons, the user can navigate in real time through the site to explore rooms, climb stairs, and so forth, and thereby get a sense of the magnitude, colors, complexity and richness of each detail of the site. Although the site's initial dataset may be huge, the walkmap provides a significantly pruned amount of data, enabling subsequent real-time processing that renders high-resolution images very quickly.

The present invention may be used with sites that no longer exist, but rather have been recreated based on books, drawings and maps with the help and guidance of archaeological and other experts. The information is archived and processed such that fast retrieval is possible, providing straightforward exploration by any average user using software on any reasonably contemporary personal computer.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment, a method comprising:
    dividing a site comprised of polygons into a plurality of visibility regions, wherein each visibility region may include a plurality of viewing angles;
    for each visibility region, determining which polygons of the site are potentially visible from within that visibility region;
    constructing a visibility map in a computer readable storage medium for each visibility region, each map indicating the polygons of the site that are potentially visible from within that visibility region wherein constructing a visibility map for each visibility region comprises providing a bitmap having a plurality of bits, including at least one bit for each polygon in the site and corresponding to one of the polygons in the site, wherein the bits in the bitmap have a value indicative of whether their corresponding polygon is visible from within the visibility region; and
    causing a change in a display based upon the visibility map.

2. The method of claim 1 wherein dividing a site into visibility regions includes dividing the site into a grid, each region corresponding to at least one grid.

3. The method of claim 1 wherein determining which polygons of the site are potentially visible from within that visibility region include collecting data from a plurality of positions in that visibility region.

4. The method of claim 1 wherein determining which polygons of the site are potentially visible from within that visibility region include collecting visibility data from a plurality of positions in that visibility region, and further comprising combining visibility data from the plurality of positions using a logical OR.

5. The method of claim 1 further comprising, determining a current visibility region in which a user is navigating, accessing the visibility map corresponding to the current visibility region to identify a set of the polygons that are potentially visible from the current visibility region, and causing display of at least some of the polygons in the set.

6. The method of claim 5 wherein causing display of at least some of the polygons in the set includes culling the set based on a perspective of the user in the current visibility region, and providing data corresponding to remaining polygons in the set to a graphics subsystem.

7. The method of claim 1 further comprising, constructing at least one ground map corresponding to the site, each ground map indicating camera heights and viewing angles for at least some positions in the site.

8. The method of claim 1 further comprising, constructing at least one trigger map corresponding to the site, each trigger map indicating actions to take with respect to at least some positions in the site.

9. The method of claim 1 further comprising, constructing at least one collision fence map corresponding to the site, each collision fence map preventing a user navigating in the site from moving to a position corresponding to the fence.

10. A computer-readable medium having computer-executable instructions for performing the method of claim 1.

11. A system for presenting a virtual tour of a site comprised of visible polygons, comprising:
    an archiving process that 1) divides the site into a plurality of visibility regions that may each correspond to a plurality of viewing angles, and 2) for each visibility region, determines which polygons of the site are potentially visible from within that visibility region;
    a walkmap constructed via the archiving process, the walkmap including a visibility map corresponding to each visibility region, each visibility map indicating the polygons of the site that are potentially visible from the corresponding region, wherein each visibility map corresponds to a bitmap, each bitmap including, for each polygon of the site, at least one bit representing whether or not that polygon is potentially visible from the visibility region that corresponds to the visibility map;
    a transfer medium for recording the walkmap in association with polygon data;
    executable program code that receives commands from an input mechanism, the commands positioning a user camera in a position in a current visibility region of the site; and
    a visible surface determination engine in communication with the executable program code to obtain the position, the visible surface determination engine configured to 1) access a current visibility map corresponding to the current visibility region, 2) determine which polygons identified via the current visibility map are visible from the position, and 3) communicate corresponding polygon data to a graphics subsystem to render an image corresponding to the polygon data.

12. The system of claim 11 wherein the archiving process divides the site into a grid, and wherein each visibility region corresponding to at least one grid.

13. The system of claim 11 wherein each bitmap is compressed into the visibility map for storing onto the transfer medium.

14. The system of claim 13 wherein the current visibility map corresponding to the current visibility region is expanded into memory from its compressed state.

15. The system of claim 11 wherein the visible surface determination engine culls data corresponding to polygons of the current visibility map that are not visible from the position.

16. The system of claim 11 wherein the walkmap includes at least one ground map corresponding to the site, each ground map indicating camera heights and viewing angles for at least some positions in the site.

17. The system of claim 11 wherein the visible surface determination engine accesses a ground map corresponding to the position to determine which polygons identified via the current visibility map are visible from the position, based on a camera height and viewing angle.

18. The system of claim 11 wherein-the walkmap includes at least one trigger map corresponding to the site, each trigger map indicating actions to take with respect to at least some positions in the site.

19. The system of claim 11 wherein the visible surface determination engine accesses a trigger map corresponding to the position and takes an action in response thereto.

20. The system of claim 19 wherein the action comprises sending a message directed towards execution of a script.

21. The system of claim 11 wherein the walkmap includes at least one collision fence map corresponding to the site.

22. The system of claim 21 wherein the visible surface determination engine accesses a collision fence map corresponding to the position to determine whether executing a command to move to another position would cause a collision.

23. A computer-readable medium having stored thereon a data structure, comprising:
a plurality of polygons of a site, each polygon comprising polygon data that enables that polygon to be rendered on a display;
a plurality of visibility maps, each visibility map corresponding to a distinct region of the site, each visibility map including data indicative of whether each polygon of the site is potentially viewable from the region that corresponds to that visibility map, wherein each visibility map corresponds to a bitmap, each bitmap including, for each polygon of the site, at least one bit representing whether or not that polygon is potentially visible from the visibility region that corresponds to the visibility map; and
wherein for any position in the site, a corresponding one of the visibility maps is accessible to determine the polygons of the site that are potentially visible from that position.

24. The data structure of claim 23 further comprising at least one ground map corresponding to the site, each ground map indicating a camera height and viewing angle for a set of at least one of the polygons.

25. The data structure of claim 23 further comprising at least one trigger map corresponding to the site, each trigger map indicating at least one action to take with respect to a set of at least one of the polygons.

26. The data structure of claim 25 further comprising message data corresponding to each action.

27. The data structure of claim 23 further including a walkmap, the walkmap including a visibility map corresponding to each visibility region, each visibility map indicating the polygons of the site that are potentially visible from the corresponding visibility region wherein the walkmap includes at least one collision fence map, each collision fence map indicating invalid positions in the site.

28. A computer-implemented method, comprising:
receiving a request to navigate to a location in a site;
in response to the request, establishing a position and viewing perspective corresponding to the location;
accessing a visibility map based on the position, the visibility map indicating polygons of the site that are potentially visible from the viewing perspective, wherein each visibility map may include a plurality of viewing perspectives, wherein each visibility map corresponds to a bitmap, each bitmap including, for each polygon of the site, at least one bit representing whether or not that polygon is potentially visible from the visibility region that corresponds to the visibility map;
determining from the position and viewing perspective which of the polygons of the site that are potentially visible are within a viewing angle corresponding to the viewing perspective; and
providing data corresponding to the polygons that are within the viewing angle to the graphics subsystem.

29. The method of claim 28 wherein establishing a position and viewing perspective corresponding to the location comprises, accessing a collision map, determining whether the collision map indicates that the location requested is not allowed, and if allowed, selecting the position as the requested location, and if not allowed, selecting another position that is allowed based on the requested location and data in the collision map.

30. The method of claim 28 wherein establishing a position and viewing perspective corresponding to the location comprises, accessing a ground map to obtain height and viewing angle information corresponding to the position and viewing perspective.

31. The method of claim 28 further comprising, accessing a trigger map based on the position, determining whether the trigger map indicates an action is to be taken, and if so, taking the action.

32. The method of claim 31 wherein taking the action comprises accessing message data and sending a message including the message data to executable program code.

33. A computer-readable medium having computer-executable instructions for performing the method of claim 28.

* * * * *